US005745649A

United States Patent [19]
Lubensky

[11] Patent Number: 5,745,649
[45] Date of Patent: Apr. 28, 1998

[54] AUTOMATED SPEECH RECOGNITION USING A PLURALITY OF DIFFERENT MULTILAYER PERCEPTION STRUCTURES TO MODEL A PLURALITY OF DISTINCT PHONEME CATEGORIES

[75] Inventor: David M. Lubensky, New Milford, Conn.

[73] Assignee: NYNEX Science & Technology Corporation, White Plains, N.Y.

[21] Appl. No.: 820,937

[22] Filed: Mar. 19, 1997

Related U.S. Application Data

[63] Continuation of Ser. No. 271,595, Jul. 7, 1994, abandoned.
[51] Int. Cl.$^6$ ............................................. G10L 5/04
[52] U.S. Cl. ................................. 395/2.41; 395/2.63
[58] Field of Search ................................ 395/2.41, 2.65, 395/2.09, 2.66, 2.63, 2.64, 2.58, 2.59

[56] References Cited

U.S. PATENT DOCUMENTS

| | | | |
|---|---|---|---|
| 4,975,961 | 12/1990 | Sakoe | 381/43 |
| 4,977,599 | 12/1990 | Bahl et al. | 381/43 |
| 5,040,215 | 8/1991 | Amano et al. | 395/2.41 |
| 5,075,896 | 12/1991 | Wilcox et al. | 382/39 |
| 5,109,418 | 4/1992 | Van Hemert | 381/43 |
| 5,131,043 | 7/1992 | Fujii et al. | 381/41 |
| 5,140,668 | 8/1992 | Hattori | 395/2 |
| 5,146,593 | 9/1992 | Brandle et al. | 395/700 |
| 5,165,095 | 11/1992 | Borcherding | 397/88 |
| 5,170,432 | 12/1992 | Hackbarth et al. | 381/43 |
| 5,228,087 | 7/1993 | Bickerton | 381/43 |
| 5,233,681 | 8/1993 | Bahl et al. | 395/2 |
| 5,263,117 | 11/1993 | Nadas et al. | 395/2 |
| 5,278,942 | 1/1994 | Bahl et al. | 395/2 |
| 5,317,673 | 5/1994 | Cohen et al. | 395/2.41 |
| 5,404,422 | 4/1995 | Sajamoto et al. | 395/2.41 |
| 5,410,635 | 4/1995 | Sakoe | 395/2.41 |
| 5,457,770 | 10/1995 | Miyazawa | 395/2.41 |

OTHER PUBLICATIONS

IEEE international conference on neural networks, Rossen et al., "Training methods for a connectionist model of consonant-vowel syllable recognition", pp. 239–246 vol. 1, Jul. 1988.

COMSIG 1989, Van der Merwe et al., "Back-propagation Networks for phoneme recognition", pp. 143–148, Jun. 1989.

Austin, S., Zavaliagkos, G., Makhoul, J., and Schwartz, R., "Speech Recognition Using Segmental Neural Nets," ICASSP–92, San Francisco, CA, Mar. 1992, pp. I–625–629.

Chigier, B., and Leung, H.C., "The Effects of Signal Representations, Phonetic Classification Techniques, and The Telephone Network," ICSLP–92, Banff, Canada, Oct. 1992, pp. 97–100.

Fahlman, S.E., and Labiere, C., "The Cascade–Correlation Learning Architecture". Carnegie–Mellon University, Computer Science Dept., Ref. No. CMU–CS–90–100, Feb. 1990.

Hon, H., "Vocabulary–Independent Speech Recognition: the VOCIND system," P.h.D Thesis, Carnegie–Mellon University, Mar. 1992.

(List continued on next page.)

Primary Examiner—Allen R. MacDonald
Assistant Examiner—Richemond Dorvil
Attorney, Agent, or Firm—Michaelson & Wallace; Michael P. Straub; Peter L. Michaelson

[57] ABSTRACT

For speech recognition systems a method for modeling context-dependent phonetic categories using artificial neural nets has been described. First, linguistically motivated context-clustering is employed to reduce the number of context-dependent categories. Second, phone-specific MLP structures are used where the number of outputs in each MLP is based on the number of left and right contexts occurring in a training database. The structure of each MLP can be automatically determined using the cascade-correlation learning algorithm.

7 Claims, 7 Drawing Sheets

OTHER PUBLICATIONS

Jankowski, C., Kalyanswamy, A., Basson, S., and Spitz, J., "NTIMIT: A Phonetically Balanced, Continuous Sppech, Telephone Bandwidth Speech Database," ICASSP–90, Albuquerque, NM, Apr. 1990, pp. 109–112.

Lee, K., "Large–Vocabulary Speaker–Independent Continuous Speech Recognition: the SPHINX system," P.h.D Thesis, Carnegie–Mellon University, Apr. 1988.

Leung, H.C., Hetherington, L.L, and Zue, V., "Speech Recognition Using Stochastic Segment Neural Networks," ICASSP–92, San Francisco, CA, Mar. 1992, pp. I–613–616.

Lucke, H.; Fallside "Expanding the Vocabulary Of A Connectionist Recognizer Trained On The Darpa Resource Management Corpus," IEEE–92 Cambridge University Engineering Dept., UK, Sep. 1992, pp. I–605–608.

Allen, J; "A Perspective on Man–Machine Communication by Speech," Proceedings of the IEEE, vol. 73, No. 11, Nov. 1985; pp. 1541–1550.

Graff, D.E.; Lynch, T.E.; "Acoustic Phonetic Techniques For Future Automatic Speech Recognition Systems," RCA Engineer 31–1, Jan./Feb. 19, pp. 4–10.

Raj Reddy, D. "Speech Recognition by Machine: A Review," Originally appeared in IEEE Proceedings 64(4):502–531, Apr. 1976.

Lea, Wayne A., Speech Communication Research Laboratory "The Value Of Speech Recognition Systems," Originally appeared in Trends In Speech recognition, pp. 3–18, Speech Science Publications (1986).

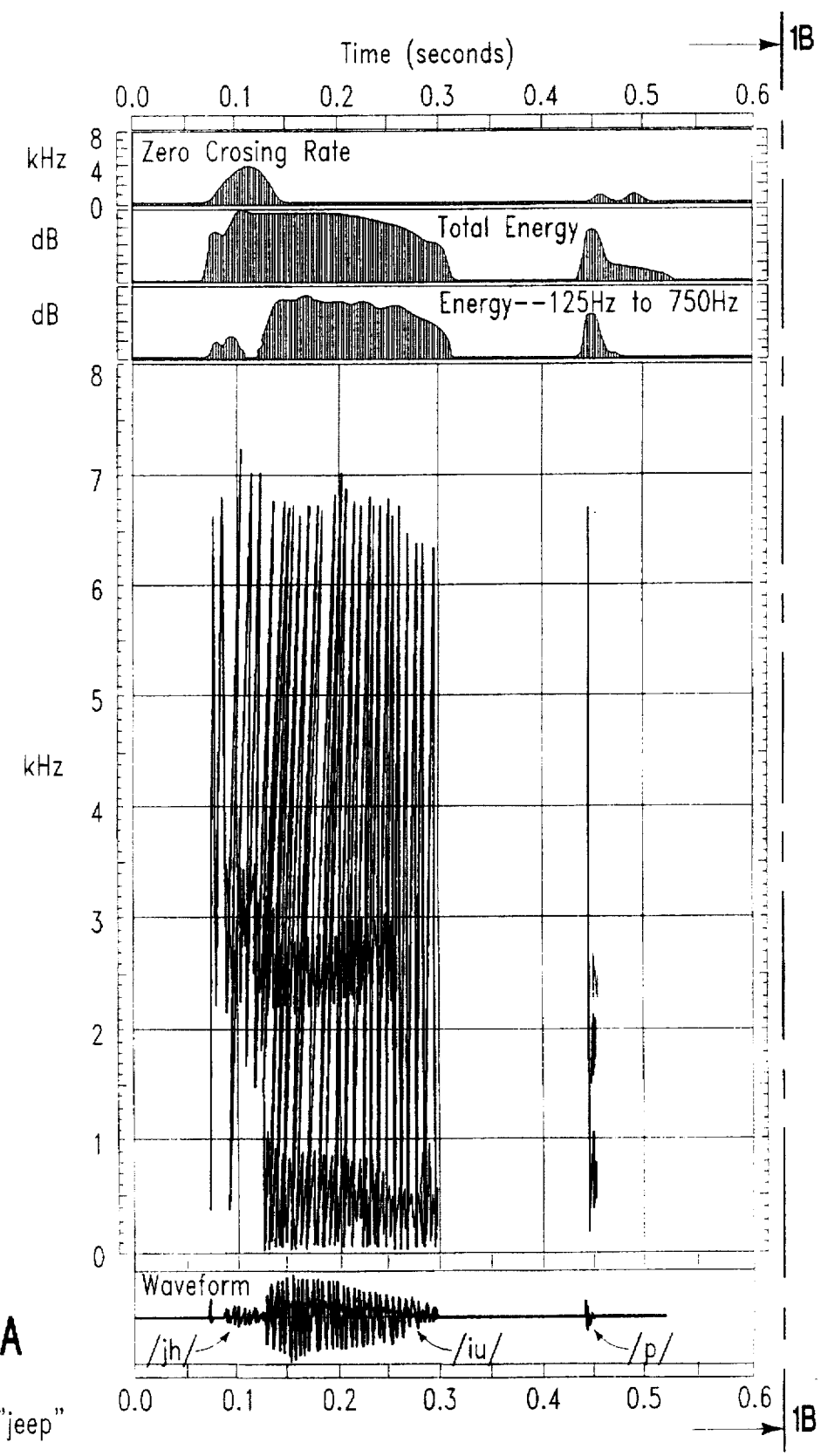

Schematic diagram of the hybrid SNN/HMM system
using the N-best rescoring paradigm 1  aa ao ah
2  ae eh
3  aw w uh uw ow ux
4  ax ax-h ix
5  axr er
6  ay y ih iy ey oy
7  b m em v
8  ch sh
9  d n en nx dx
10 dh
11 hh hv
12 el l
13 f p
14 g ng eng z
15 jh zh
16 k
17 r
18 s t
19 th
20 cl pcl tcl kcl qcl bcl dcl gcl epi h# pau sil 20 left-context equavalence classes FIG. 3

1  aa aw ah ay ow oy ao
2  ae eh ey
3  ax ax-h ix
4  axr er
5  b v p f
6  ch s t
7  d z jh dx
8  dh th
9  hh hv
10 el l
11 en n nx
12 g k
13 ih iy y
14 m em
15 ng eng
16 r
17 sh zh
18 uh w uw ux
20 cl pcl tcl kcl qcl bcl dcl gcl epi h# pau sil 19 right-context equavalence classes FIG. 4

1 V ey ae iy eh ih ay ow uw aa ao aw oy er ah ax axr ux uh ix ax-h axh
2 N m n ng em en nx eng
3 S p t k kh b d g jh ch dx
4 # bcl dcl gcl pcl tcl kcl ub ud ug up ut uk epi pau h# q h#2
5 L l w wh r y el
6 F s sh z zh dh th v f h hh hv

FIG. 5   1 broad context equavalence classes

| context model | Total number of categories | Maximum contexts/phone | Minimum contexts/phone |
|---|---|---|---|
| 39-left,39-right | 9947 | 514 /l/ | 47 /dh/ |
| 20-left,19-right | 4794 | 206 /iy/ | 30 /dh/ |
| 20-left,6-right | 2196 | 96 /iy/ | 18 /ng/ |
| 6-left,19-right | 2146 | 90 /ow/ | 15 /ng/ |
| 6-left,6-right | 885 | 36 /ow/ | 6 /ng/ |

Context-dependent categories in a large-vocabulary American English isolated-word database.

FIG. 6

| speaker | 25-word | | 51-word | |
|---|---|---|---|---|
| | train | test | train | test |
| male | 2091 | 519 | 2558 | 1275 |
| female | 2534 | 615 | 3067 | 1480 |
| child | 143 | 44 | 175 | 109 |
| total | 4768 | 1178 | 5800 | 2864 |

City name database

FIG. 7

|  | cntx-ind | triphone | Generalized context-dependent | | | |
|---|---|---|---|---|---|---|
|  | 39 | 39-left 39-right | 20-left 19-right | 6-left 19-right | 20-left 6-right | 6-left 6-right |
| 25-word vocabulary | | | | | | |
| Error rate | 6.2% | 3.8% | 3.4% | 3.8% | 3.2% | 3.4% |
| Numb of phones | 39 | 203 | 194 | 159 | 154 | 117 |
| Numb of params | 14,247 | 17,803 | 17,208 | 14,943 | 14,618 | 12,213 |
| % params change | 0 | +24.9 | +20.8 | +4.9 | +2.6 | -14.3 |
| 51-word vocabulary | | | | | | |
| Error rate | 10.65% | 7.4% | 7.0% | 7.3% | 7.8% | 8.0% |
| Numb of phones | 39 | 359 | 320 | 257 | 246 | 180 |
| Numb of params | 14,247 | 27,943 | 25,408 | 23,313 | 20,598 | 16,308 |
| % params change | 0 | +96.0 | +78.3 | +49.6 | +44.6 | +14.5 |

Word error rate, number of phones, and parameter statistics using 6 acoustic models for 25-word and 51-word city name recognition tasks.

FIG. 8

Vocabulary-independent recognition results on City Name-I (CN-I) and City Name-II (CN-II) tasks. NTIMIT (NT) and City Name-I (CN-I) databases were used for training boundary and phonetic classifiers.

AUTOMATED SPEECH RECOGNITION USING A PLURALITY OF DIFFERENT MULTILAYER PERCEPTION STRUCTURES TO MODEL A PLURALITY OF DISTINCT PHONEME CATEGORIES

This application is a continuation of application Ser. No. 08/271,595, filed Jul. 7, 1994, now abandoned.

FIELD OF THE INVENTION

This invention relates to methods and procedures for context-dependent subword modeling using Artificial Neural Networks (ANN), in combination with Hidden Markov Models (HMM) and specifically with the use of such techniques in a segment-based speech recognition framework.

The present invention provides improvements in accuracy/speed in automatic speech recognition (ASR) which may be used, for example, in many hands- and eyes-busy application and which can be more accurate than traditional notekeeping and data entry methods, or, as in a preferred embodiment, in telephone network services.

BACKGROUND OF THE INVENTION

It has been demonstrated that computers can be more or less effectively programmed to recognize human speech so as to generate control and commands and perform data entry and can be designed to be trained on acoustic examples to enlarge the recognition capability. Recognition accuracy is typically affected by application vocabulary size, task complexity (e.g. perplexity) and the variations among training data and actual usage conditions. Recognition can be done with greater accuracy if the vocabulary can be anticipated from the application, which facilitates training. This means that ASR systems work more effectively where the task is well-defined. Moreover, from a good engineering viewpoint ASR systems should minimize the number of computations or decisions required to achieve recognition of the information contained in a string of spoken words.

There is growing industrial importance of ASR systems: in manufacturing—as a man/machine command and control interface, for voice dialing or automated directory assistance in telephony and for direct data and instruction input in computing. Indeed, it has been shown that many applications have resulted in improved accuracy and speed of operation of the processes involved.

The recognition processes generally comprise recognizing words, subword segments or other units of speech, e.g. syllables etc., including the basic phonetic units, phonemes, of which human speech is composed. This is done by first obtaining a signal representing the time-variant spectral content of speech. Thereafter the recognition process involves assessment of those temporal and spectral characteristics of that signal for creating such hypotheses about the phonetic content of speech as may be indicated by these features. (In the ASR field, statistical modelling techniques such as Hidden Markov Models (HMM) and Multilayer Preceptrons (MLP's also called Artificial Neural Networks, or ANN's) may be employed in that assessment.)

Such characteristics are illustrated in FIG. 1, showing the signal for the words "jeep" and "huge". As can be seen, the amplitude and frequency of the speaker's voice varies across a word. In the word shown, "jeep", various subword groupings of similar amplitude range and/or frequency can be observed. These more or less correspond to the basic subword units, the phonemes, associated with letters "j", "ee", "p" in that word (i.e. the phonemes /jh/,/iy/ and /p/). The problem in automatic speech recognition is knowing what of the information shown for the "jeep" in spectrogram example represents what, i.e., where and what information represents a /jh/, and then not just for a single example, but across many speakers, who have different accents, speaking styles and different vocal tract characteristics. The challenge is to create a system that is accurate, flexible and trainable to recognize the content of the speech of many speakers while being an efficient process in use of computational resources.

ASR is more accurate and quicker where the task is relatively specific and/or the vocabulary is relatively capable of being anticipated and where specific programming techniques may have advantages. In assessing the temporal and spectral features for example, studies of HMM techniques using models of speech content show some specific kinds of those models used to create the phonetic content hypotheses to be advantageous. One such group of models rely on recognition of the phonemes in context: for example, an /iy/ phoneme surrounded by a /jh/ and a /p/ in the "jeep" example, (called "left and right context" models) or a model of /iy/ only preceded by a /jh/ (a "left context" model) or only followed by a /p/ (a "right context" model). This is called context-dependent modeling.

The invention recognizes that the number of such context-dependent models used in a particular application need not be as detailed as all the possibilities in the full spoken language, nor do all phoneme variants need be addressed in particular, but can be classified together for computational efficiency if the speech recognition task allows it.

The present invention addresses automatic speech recognition in modeling a large number of context-dependent subword units using Artificial Neural Networks (ANN, also called Multilayer Perceptrons, or MLP's) in a stochastic segmental framework. In systems of this type, context-dependent subword modeling has been shown in the prior art to improve accuracy on a 25-isolated-word speech recognition task [Leung, H. C., Hetherington, L. I., and Zue, V., "Speech Recognition Using Stochastic Segment Neural Networks," ICASSP-92, San Francisco, Calif., March 1992, pp. I-613–616.], having 203 unique subword categories which are modeled by a single feedforward ANN. There, triphone contexts (a related group of three phonemes) are determined by enumerating all possible left/right phonetic contexts of a phoneme in the 25-word pronunciation dictionary. To extend this simple approach to modeling all possible context-dependent subword categories in a large-vocabulary task, a problem of scaling is encountered—i.e. a requirement for a larger training database and additional computational resources. As part of an effort to develop a flexible-vocabulary speech recognition system the invention recognizes it to be desirable to build an inventory of context-dependent subword models which can be used without vocabulary-specific training data in a variety of applications. The invention thus contemplates a method to model a large number of context-dependent subword categories by generalized context clustering (as described below) in a modular ANN structure. An isolated-word speech recognition task has been tested and has shown an improvement in recognition accuracy and great improvement in computational efficiency with the context-clustering approach contemplated by the invention.

OBJECTS OF THE INVENTION

The objects of the invention thus are:
- Improved accuracy in recognition,
- Increased computational efficiency;
- Simplified modeling of phonetic content of words
- Simplified modeling of the phonetic content of words by postulating classes of phonemes and phoneme contexts;

More effectively evaluating word candidate hypotheses using a combination of ANN and HMM techniques.

Finally, assessing hypothesis probabilities in the course of evaluating word or subword candidates can be improved by utilizing HMM modeling in conjunction with MLP techniques.

These and other objects are realized in the invention, which employs linguistically motivated generalized context-dependent subword unit modeling in combination with phone-specific MLP structures to create a very robust, highly accurate, phonetically-based, flexible-vocabulary speech recognition system for a variety of applications. It was developed with a particular relevance to tasks over the telephone network.

BRIEF DESCRIPTION OF THE DRAWINGS

In the following discussion of preferred embodiments of the invention, reference is made to the appended figures in which:

FIGS. 3, 4 and 5 represent equivalence classes which may be used in a clustering procedure according to the invention, and which may be employed in the systems of FIG. 2A and 2B.

FIG. 6 illustrates Context Dependent categories for a large-vocabulary American English isolated word database.

FIGS. 7, 8 and 9 illustrate test results from experiments relating to the invention.

DETAILED DESCRIPTION OF PREFERRED EMBODIMENTS

Figure 1B:
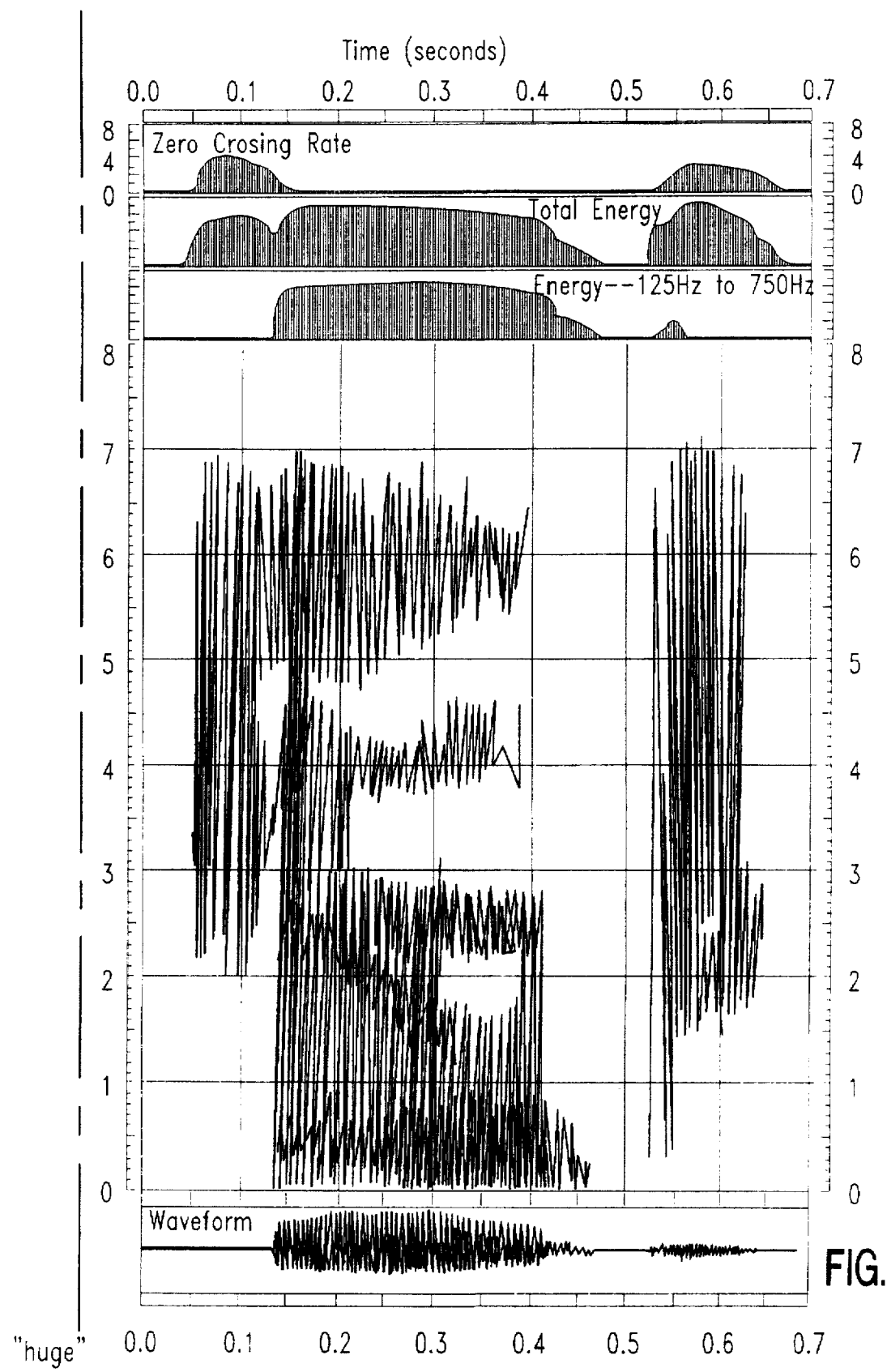
FIG. 1 shows a spectrogram for an example word "jeep".

The present invention proposes improving phonetic modeling and phonetic classification using context-modeling in various levels of generality. For example levels are formed by using context-clustering (to be described further below) which is a form of generalized modeling that is based on the assumption that left context mostly effects the beginning of a phone and right context influences the end of a phone. Moreover preferred embodiments employ phonetic models in other generalized groupings or levels based on other shared or similar characteristics made by further use of such a context-clustering approach. One such further level or grouping is based on merging those left/right phones that are assumed to have the same or similar effect on the phone in questions, resulting in a predefined set of 20-left and 19-right phonetic context classes. In yet another level or grouping, left/right contexts are merged into a predefined set of 6-broad phonetic categories. This results in 4 acoustic reduced-triphone and triphone-like models: 20 left and 19 right contexts (reduced-triphone); 20-left and 6-broad phonetic contexts (triphone-like with more detailed left context); 6-left and 19 right contexts (triphone like with more detailed right context), and 6 left and 6 right phonetic context (triphone like). From this description, those skilled in the art will appreciate that the approach used in the invention in setting up the various levels or groupings of subword unit models is linguistically motivated, i.e. it is based on the place of articulation of phonemes in the human vocal tract to capture the similarity of contextual effects and reduce the number of context-dependent categories, thus enabling phone-specific MLP structures to effectively model a large number of phonemes with various degrees of contextual detail. The process of constructing and training phone-specific MLP structures can be completely automated using data-driven cascade-correlation learning procedures. A modular ANN structure is preferably employed where each phone is modeled by feedforward ANN and the number of output units correspond to the number of contexts for the phone in question. For example, in a 20,000-word vocabulary (as in a pocket Webster Dictionary) the number of context-dependent categories can be quite large to be effectively modeled in a single ANN, as shown in FIG. 6. The basic problem that is being addressed is how to effectively model and efficiently train a large number of context-dependent subword units using ANN for vocabulary-specific and flexible-vocabulary speech recognition tasks. For example, in an experiment involving 25-isolated word vocabulary of city names there were 203 triphones which can be modeled easily by a single ANN,: in a 51 isolated-word vocabulary (again city names) there were 360 triphones which could also be so modeled; but in a 20,000-isolated-word vocabulary (Webster pocket dictionary) there are about 10,000 triphones, a number that is prohibitively large to be modeled in a single ANN due to excessive computational and training database requirements. Therefore, although artificial neural networks have been shown to outperform more conventional statistical pattern classification techniques (Single Gaussian and Mixture Gaussian) on small but difficult tasks [see Chigier, B., and Leung, H. C., "The Effects of Signal Representations, Phonetic Classification Techniques, and The Telephone Network," ICSLP-92, Banff, Canada, October 1992, pp. 97–100.], they have not been used in "large-vocabulary" (i.e. approx. 2000 triphones) speech recognition applications. Theoretically, modeling a large number of triphones using ANN does not require any special changes in the design, structure, and training paradigm. However, in practice the problem is beyond the scope of today's powerful computers, and in particular it exceeds the capabilities of "reasonably" priced hardware platforms for real-time applications in the telephone network.

Subword modeling has become an increasingly important issue in design and development of vocabulary-specific and flexible-vocabulary speech recognition systems. As the size of the vocabulary exceeds the number of words for which the users are willing to provide training data, the storage requirements become enormous due to non-sharing of training data between words, and whole-word modeling becomes practically impossible. Recent studies (Chigier, supra) have demonstrated that ANN structures are capable of capturing some critical aspects of dynamic nature of speech, and can achieve superior recognition performance on small but difficult phonetic discrimination tasks. It can be seen that these models can be expanded to make them more useful for context-dependent subword modeling. A problem that emerges, however, in any attempt to apply ANN to a full speech recognition problem, is the problem of scaling. Simply extending ANN networks to ever larger structures and retraining them soon exceeds the capabilities of even the fastest and largest of today's super computers. Moreover, the search complexity of finding an optimal solution in a huge space of possible network configurations quickly assumes unmanageable proportions. In the invention, therefore (based on a set of experiments aimed at isolated-word recognition) it is possible to solve large scale phonetic content discrimination tasks by exploiting the hidden structure of smaller trained subcomponent ANN. Methods and procedures are described below that bring the design of large sale ANN based speech recognition systems within the reach of today's computational resources.

1. Recognition Systems

Figure 2A:
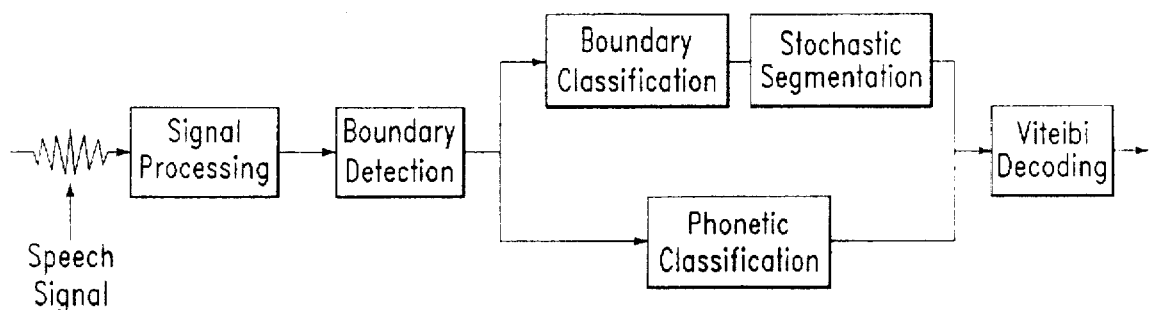
FIGS. 2A and 2B show diagrams of ASR systems of the type in which the invention may be employed.
Figure 2B:
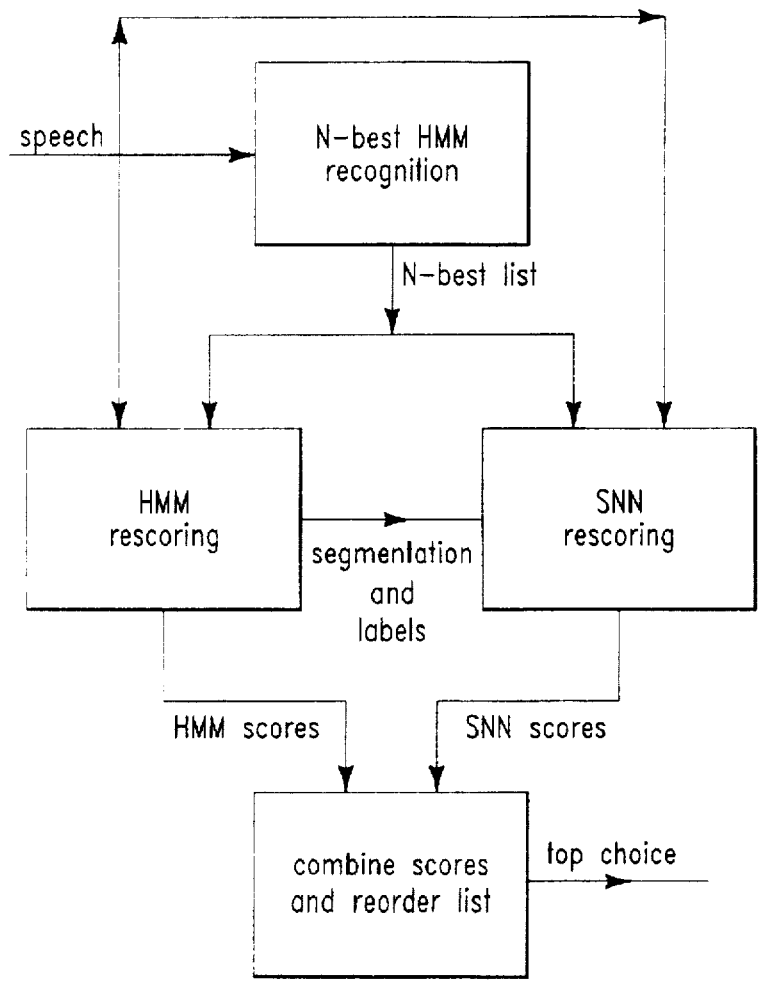

The purpose of this section is to briefly describe stochastic segmental systems of the type for which the invention may be employed. (See Leung, H. C., Hetherington, L. I., and Zue, V., "Speech Recognition Using Stochastic Segment Neural Networks," ICASSP-92, San Francisco, Calif., March 1992, pp. I-613–616. or see Austin, S., Zavaliagkos, G., Makhoul, J., and Schwartz, R., "Speech Recognition Using Segmental Neural Nets," ICASSP-92, San Francisco, Calif., March 1992, pp. I-625–629. for descriptions of their systems.) Such systems are generally illustrated in FIGS. 2A and 2B respectively.

Using Leung et al's system as an example (shown in FIG. 2A), that system is characterized by 6 major components: (1) signal processing; (2) boundary detection, (3) boundary classification, (4) stochastic segmentation, (5) phonetic classification, and (6) Viterbi decoding.

The signal processing involves creating and evaluation of features of an acoustic signal such as one or more of the spectral, temporal, duration and energy characteristics representative of the spoken word, such as that shown in FIG. 1 and previously discussed.

As discussed in the noted Leung et al. and Austin et al. references, the boundary detection module may be a simple Euclidean distance measure to locate spectral changes in the speech signal of the type shown in FIG. 1. The boundary classification component may be a MLP structure with the context-dependent input-feature vector (4 boundaries on the left and 4 on the right) to compute an inter-segment boundary probability. Stochastic segmentation computes an overall segment probability using boundary scores. It is known in this prior art that stochastic segmentation can be achieved either using the above described framework or HMMs. Also, in Austin, phonetic segmentation was performed using HMMs and stochastic segmental neural nets were used to rescore the HMM results. The phonetic classification module computes phonetic scores using context-dependent and/or context-independent MLPs. Finally, the Viterbi decoding module finds the highest probability word hypothesis by combining the scores from the stochastic segmenter and the phonetic classifier. These features of recognition systems are known in the art and do not form a part of the present invention.

In the invention improvements in recognition accuracy and computational resource use are obtained by applying linguistically motivated context-clustering in modelling phonetic content so as to capture the similarity of contextual effects. The outcome is improved generalized context-dependent models with various degree of contextual detail.

Further, the invention also uses phone-specific MLP structures for modeling context-dependent subword unit categories. In a preferred embodiment using this approach, the number of outputs for each MLP is determined by the number of left and right phonetic contexts occurring in an application-related database of American English isolated words. (Such databases can be developed from acoustic data for volunteer speakers of an identified vocabulary and should be specifically designed to incorporate all phonemes in many phonetic contexts).

2. Subword Models

With regard to the ASR systems for which the invention has been developed, those systems most commonly use either context-independent or context-dependent phonetic models, or both. To furnish an understanding of the nature of the improvements contemplated by the invention both types of models will be generally discussed in the following sections 2.1 and 2.2.

2.1 Context Independent Subword Models

In English, there are about 50 phonemes which can be easily trained and modeled in a context-free mode. Context-independent models are actually quasitask-independent. This means they can be, in principle, trained on one vocabulary and tested on another, but in practice accuracy using context-independent models is not consistent across vocabularies. This is primarily due to the implicit context-dependency captured by the context-independent phonetic models. For example, phonetic models which are trained on a phonetically rich continuous-speech database (NTIMIT) are somewhat inadequate for an isolated-word recognition task. Co-articulatory effects across word boundaries and stress patterns in a continuous speech database are different from those occurring in an isolated-word task. In addition, the differences between read speech versus spontaneous speech and recording channel characteristics have been shown to affect accuracy even when context-independent phone models are trained on the same vocabulary (Chigier, B., Spitz, J. "Are Laboratory Databases Appropriate for Training and Testing Telephone Speech?" Proc. ICSLP 90, pp. 1017–1020, Kobe, Japan, November 1990).

2.2 Context Dependent Models

Context-dependent acoustic models provide a much more robust representation of spectral and temporal structure of phones than context-independent phone models. In this description of the invention, the term "context" refers to the immediate left and right phone relative to the modeled phone. For example, phoneme /t/ in the word "stop" is modeled separately from a phoneme /t/ in the word "step". Although detailed context-dependent phone models are well suited for capturing most important co-articulatory effects, they suffer from some practical drawbacks such as scaling to a large-vocabulary task with limited amount of training data and lack of complete context coverage of the testing vocabulary by the context occurring in the training vocabulary. There are many phones which have similar acoustic effects on other phones; consequently, phones can be merged to form a cluster. In the invention this enables generalized context-dependent clustering approach is used to capture the similarity of contextual effects so as to make the models robust and achieve the aforementioned computational efficiencies. Such context-dependent subword modeling is employed in the invention to enable it to address a variety of applications, such as for example, automated operator services for, inter alia, directory assistance in the telephone network. Further, phone-specific Multi Layer Perceptron (MLP) structures are used where each phone is modeled by one or more networks, and the number of outputs in each network is based on the number of left and right contexts occurring in a training database.

The invention has recognized that because many contexts are very similar, or exhibit similar effects, context-dependent phonemes can be merged into equivalence classes (herein also "context clustering") without sacrifice of significant recognition performance. (In this description, as noted, the term "context" refers to the immediate left and/or right phones). This context-clustering leads to fewer, and potentially better trainable acoustic models. In a preferred embodiment, the Arpabet of 39 phonetic labels (reduced from 62) was chosen.

As an example of those shared contextual effects, there are phonemes which exhibit a great degree of allophonic variation, such as /t/, /k/, and schwa, and there are other phonemes such as /s/ and /sh/ which are influenced very little by the context. The invention's context-clustering procedure is based on the simplifying assumption that left contexts mostly effect the beginning of a phone and right contexts mostly influence the end of a phone.

Context clustering according to the invention can enable forming varying levels of generality in the models to be used. One of them can be based on merging left and right phones according to the place of articulation in the vocal tract, resulting, in an embodiment, in a predefined set of 20-left and 19-right phonetic context classes. For instance, {b, em, m, v} are assumed to have the same effect on the beginning of the phone, whereas {b, v, p, f} may similarly effect the end of the phone. In another level, left and right contexts can merge into a predefined set of 6-broad phonetic classes: Vowels, Nasals, Stops, Semivowels, Fricatives, and Silence.

The result of this clustering procedure in a preferred embodiment is a set of generalized triphone models grouped according to various degree of contextual detail such as: (1) 20-left and 19-right, (2) 20-left and 6-right (using broad equivalence classes), (3) 6-left and 19-right (using broad equivalence classes), (4) 6-left and 6-right (broad equivalence classes). This scheme is derivable from the classes illustrated in the tables of FIGS. 3 thru 5 and others could be derived as well from the illustrated classes.

The number of different context-dependent categories and their level(s) of generality is related to the database used for training of the MLP's. Thus in a preferred embodiment, if during recognition new context-dependent units appear that were not encountered in the training database, then models having the next level of contextual detail are employed until the corresponding "coarser" (i.e. having a greater generality of context) units are found. In the worst case scenario, as a default, a context-independent acoustic model is employed. The overall performance is enhanced where a training database is created with sufficient complexity to have at least most of the broad context-dependent categories (6-left, 6-right).

To improve computational efficiency, broad context-dependent units are used to generate a list of N-best word hypotheses, and then more detailed acoustic models are applied in post-processing for rescoring the hypotheses. Even on a small-vocabulary city name recognition task for automatic directory assistance in a telephone application using the N-best paradigm, experiments show computational savings while maintaining overall recognition accuracy.

3. Phone-Specific MLPs

The described generalized context-merging procedure reduces the number of context-dependent categories from the theoretical limit of 59,319 (39×39×39) to 14,820 (20× 39×19). However, this is still a large number, and is not practical to use a single MLP with that many output units, as the necessary computational resources and training database requirements are excessively large.

The invention, therefore, uses a new scheme for modeling a large number of context-dependent categories using phone-specific neural nets. The basic principle is that for each of the chosen phonetic categories separate MLP structures are used, and the number of outputs is determined by the number of left and right contexts occurring in a training database (In the preferred embodiment, using Arpabet labels, 39 are used). This representation is similar to the decision-tree-based generalized allophones [VOCIND]. There are two similarities: (1) each phone is modeled by a separate structure (decision-tree or MLP), and (2) during recognition phonetic scores are computed only for acoustic units found in the target vocabulary. The main difference is that VOCIND decision-trees are conventionally constructed using an automatic, data-driven clustering algorithm, whereas the invention employs a linguistically-motivated knowledge-based approach.

FIG. 6 shows examples of a database that can be used to train a large number of context-dependent phone categories modeled in MLP's according to the invention.

The structure of phone-specific MLP models can be determined automatically using the cascade-correlation learning architecture known in the prior art [e.g., see Fahlman, S. E., and Labiere, C., "The Cascade-Correlation Learning Architecture", Carnegie-Mellon University, Computer Science Dept., Ref. Number CMU-CS-90-100, February 1990.]. Instead of simply adjusting the weights in the fixed size network, cascade-correlation automatically trains and adds new hidden units. There are two advantages to using cascade-correlation: (1) the network size and topology are determined automatically, and (2) the network learns much faster than the back-propagation algorithm.

4. Experimental Conditions and Results

Experiments to test the performance of the stochastic explicit segment modeling system employing the techniques of the invention were performed on a created speaker-independent isolated-word city name database (FIG. 7) collected from real customers calling directory assistance service in the metropolitan Boston area.

4.1. Vocabulary-Dependent Experiments

To measure the effectiveness of the linguistically motivated context-merging procedure, vocabulary-dependent acoustic models on both 25-word and 51-word city name database (FIG. 8) were evaluated. It is important that the boundary classifier was also trained on the target vocabulary. For each task, 6 different MLPs were trained and evaluated: one context-independent model, and 5 context-dependent models with various degree of contextual detail. All the context-dependent MLPs had 64-hidden units, and the context-independent MLP had 128-hidden units.

The results show the following:

1. Not surprisingly, context-dependent acoustic models significantly and consistently outperformed context-independent models.

2. It can be concluded that all context-dependent models achieve about the same error rate on the 25-word vocabulary. The error rate on the 51-word vocabulary nearly doubled in comparison to the 25-word results. Also, on the 51-word vocabulary context-dependent models exhibit roughly the same pattern of performance as on the 25-word vocabulary, except that the model with 20-left and 19-right contexts significantly outperformed the model with 6-broad contexts (7.0% vs. 8.0%).

3. Generalized context-dependent models use fewer parameters than detailed triphone models, and therefore significantly improve computational efficiency. In fact, broad context-dependent models (6-left, 6-right) have about the same number of parameters as context-independent models.

Based on the experiments, the linguistically-motivated context-clustering procedure is quite reasonable.

4.2. Vocabulary-Independent Experiments

In the stochastic explicit segment modeling system, both the boundary classifier and the phonetic classifier can be trained as previously described. The experiments reported in this section show the effects on accuracy when the classifiers are trained on different databases (FIG. 9).

The city name database is separated into two disjoint sets: 25 city names (CN-I), and 26 city names (CN-II). In terms of acoustic similarity, there is only a 35% triphone overlap between CN-I and CN-II. The NTIMIT (Jankowski, C., Kalyanswamy, A., Basson, S., and Spitz, J., "NTIMIT: A Phonetically Balanced, Continuous Speech, Telephone Bandwidth Speech Database," ICASSP-90, Albuquerque, N. Mex., April 1990, pp. 109–112.) database was used for training. Recognition results reported here are based on the context-independent acoustic models. Due to poor triphone coverage between training and testing databases, recognition results with context-dependent models were much worse.

Figure 9:
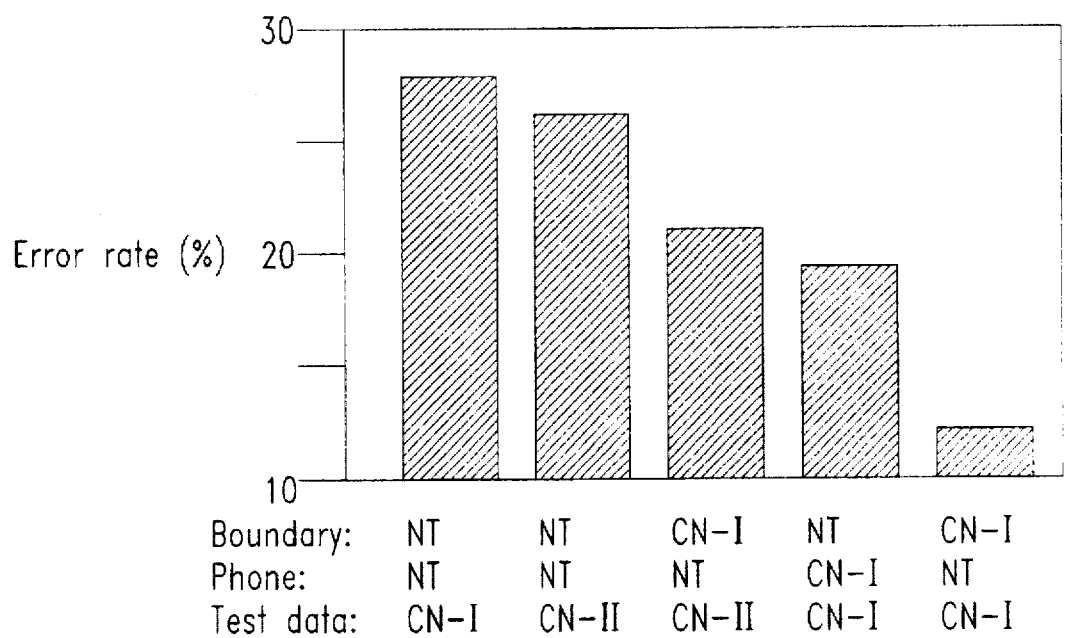

The results of the recognition tests are given in FIG. 9, and show the following:

1. When both boundary and phone classifiers are trained on NTIMIT, the error rate is 28.0% and 26.0% on CN-I and CN-II respectively.

2. When the boundary classifier and the phone classifier are trained on CN-I and NTIMIT respectively, the error rate on CN-II drops from 26% to 20%.

3. When the boundary classifier and the phone classifier are trained on NTIMIT and on CN-I respectively, the error rate on CN-I drops from 28% to 18%. However, if we exchange the training databases the error rate on CN-I drops from 28% to 12%.

Based on these experiments, it appears that the boundary classifier is more sensitive to the acoustic variations between training and testing vocabularies than the phonetic classifier.

What is claimed is:

1. A method of performing speech recognition, said method comprising the steps of:

choosing a plurality of context dependent phonetic categories to model;

modeling each of the chosen context dependent phonetic categories, using at least one multilayer perceptron (MLP) structure that is separate from MLP structures used to model other phonetic categories, the modeling step including the use of a training database; and using the models of each of the chosen context dependent phonetic categories to perform a speech recognition operation.

2. The method of claim 1, wherein the step of choosing a plurality of context dependent phonetic categories to model includes a step of:

grouping context dependent phonemes which exhibit similar contextual effects into phonetic categories to be modeled.

3. The method of claim 1, wherein the step of choosing a plurality of context dependent phonetic categories to model includes a step of:

selecting a set of generalized triphone models categorized according to various degrees of contextual detail to model.

4. The method of claim 3, wherein each context dependent phonetic category chosen to be modeled represents a group of phonemes of differing levels of context generality which comprise those representations that result from the merging of left and right contexts having similar linguistic effect on the beginning and end of a phoneme.

5. The method of claim 4, further comprising the step of performing a cascade correlation training operation to automatically train the MLP structures used to model the chosen phonetic categories.

6. The method of claim 5, wherein each one of the separate modular MLP structures used to model the chosen context dependent phonetic categories is a separate MLP network.

7. The method of claim 1, wherein each one of the separate MLP structures used to model the chosen context dependent phonetic categories is a separate MLP network.

* * * * *